Aug. 19, 1952   E. M. S. McWHIRTER ET AL   2,607,528
ELECTRICAL MEASURING CIRCUITS
Filed Jan. 2, 1947                           3 Sheets-Sheet 1
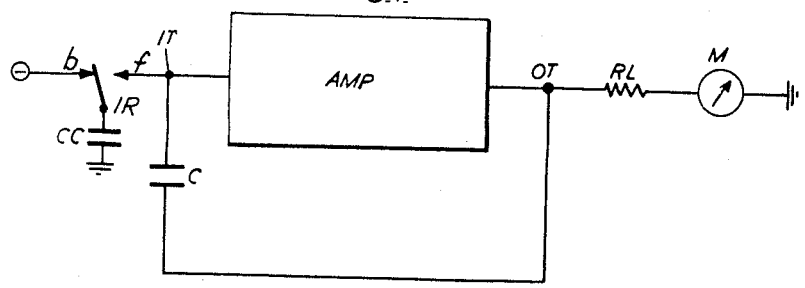
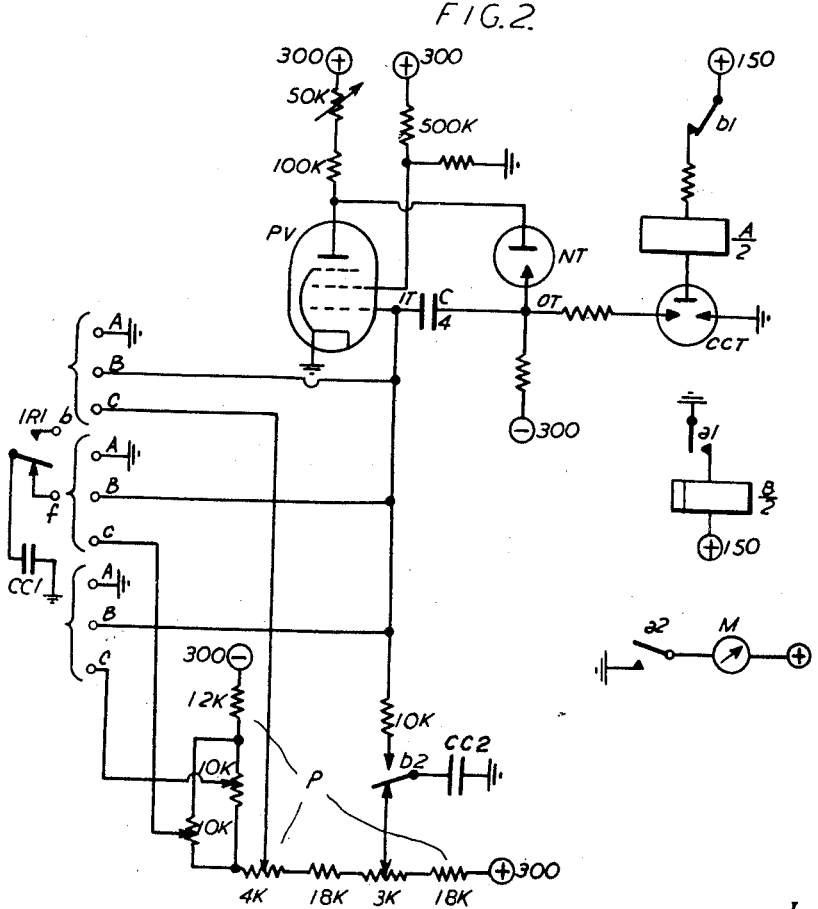

Patented Aug. 19, 1952

2,607,528

UNITED STATES PATENT OFFICE 2,607,528

ELECTRICAL MEASURING CIRCUITS

Eric Malcolm Swift McWhirter and Roland Harris Dunn, London, England, assignors to International Standard Electric Corporation, New York, N. Y.

Application January 2, 1947, Serial No. 719,772
In Great Britain January 21, 1946

6 Claims. (Cl. 235—92)

This invention relates to electrical measuring circuits.

The objects of the invention are to provide a device having a substantially linear measuring characteristic, to provide a device which is capable of measuring over an indeterminate period, and to provide a device which is capable of integrating random and variable discrete quantities and of measuring the rate of frequency of discrete pulses or charges.

It is common practice to use a condenser in measuring circuits. One of the problems in such circuits is to obtain a true response to the measured quantity in spite of the change in circuit conditions arising from the increasing charge on a measuring condenser. This can be substantially overcome by a high gain electronic amplifier in parallel with the condenser the effect of which is to reduce the tendency of the condenser input voltage to change to a small percentage which is approximately the quotient obtained by dividing 100% by the gain factor of the amplifier. Increments in the condenser charge will now take place in linear proportionality to the applied charge derived from whatever is to be measured. This arrangement utilizes the Miller effect.

The gain of the amplifier may be for instance 100 or 1000 maintaining the input voltage constant to within 1% or 0.1% respectively, according to the accuracy required.

Alternatively the input voltage to the condenser may be maintained at a level always equal to a constant voltage plus the voltage across the condenser.

In order to obtain a measuring device capable of measuring over an indeterminate period, it is proposed to discharge the measuring condenser in a controlled manner which enables the discharge to be recorded either as a rate or a quantity.

For rate measurement a condenser with an individual charging potential is discharged into the measuring condenser at intervals determined by the variable rates to be measured. A leak circuit is provided for the measuring condenser arranged to stabilize itself at a leakage rate dependent on the interval between charges whereby when stabilized discharge of the measuring condenser to a predetermined extent (which may be complete discharge) takes place in the interval between successive charges and the voltage controlling the leak circuit is substantially linearly proportioned to the rate to be measured. The leakage current is proportional to the voltage across the condenser. This voltage is used to operate an indicator or recorder.

For integrating purposes, a small condenser, or a plurality of small condensers connected to different sources, is or are charged at random intervals to an extent which may be constant or variable for each condenser, and variable between condensers.

The variable charges on the small condensers are discharged at random intervals singly, or randomly coincident, into the larger measuring condenser. A further condenser charged in an individual and constant charging circuit is adapted to be connected to the measuring condenser to discharge the latter to a predetermined extent.

The connection of the further condenser is controlled by a test circuit operating when the charge on the measuring condenser is at least equal to the quantity to be discharged.

An indicator or recorder is operated at each discharge of the measuring condenser.

Not only can separate charges of varying amounts be tipped into the measuring condenser simultaneously but charging and discharging circuits can be established simultaneously with accurate results.

The invention will be particularly described with reference to particular embodiments which are examples only of devices embodying the novel features set out in the accompanying statement of claim.

These embodiments are illustrated in the accompanying drawings in which

Fig. 1 shows the principles of the invention as applied to impulse rate measurement;

Fig. 2 shows detailed circuits of an integrating measuring device;

Figure 3:
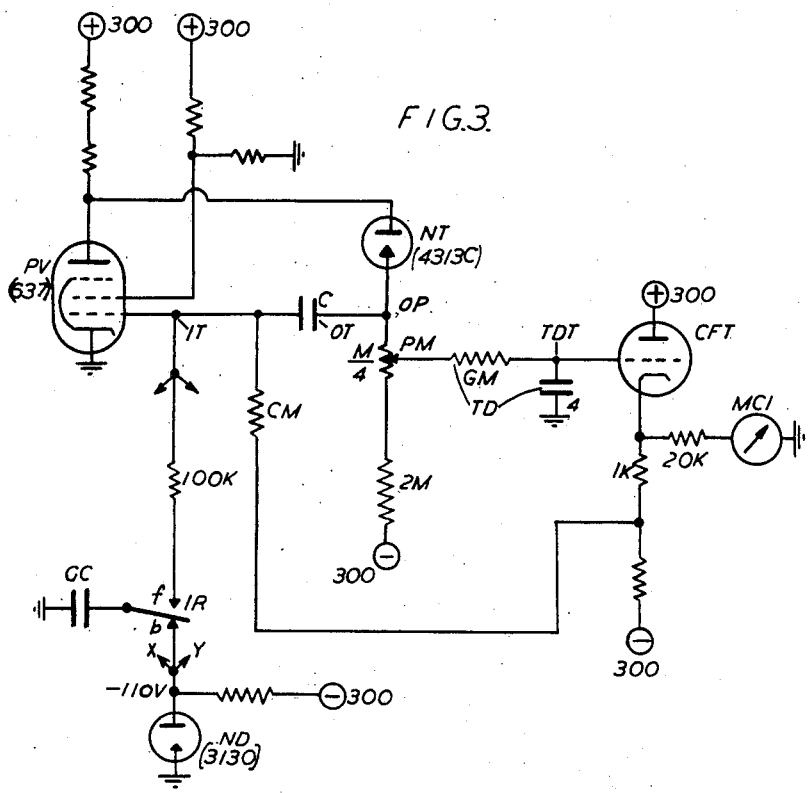
Fig. 3 shows detailed circuits of a rate measurement device.
Figure 6:
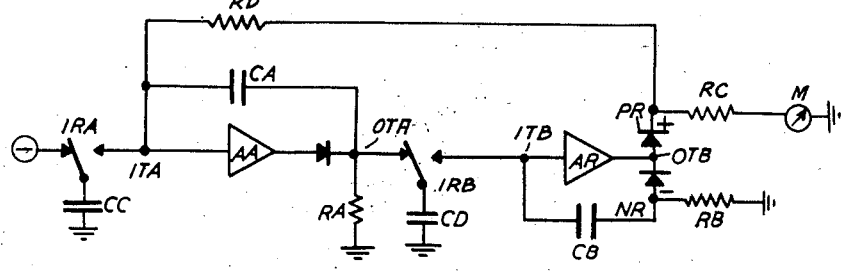
Figure 7:
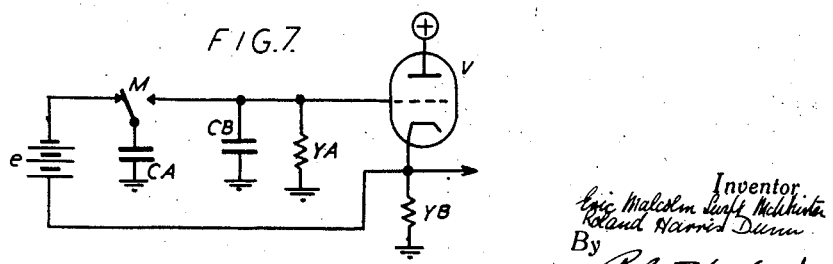
Figure 4:
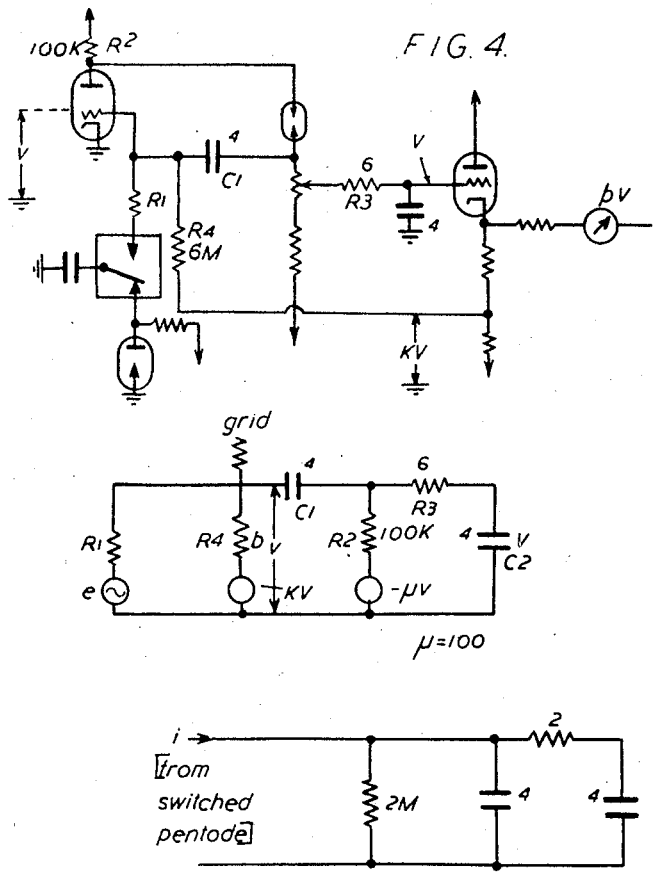
Fig. 4 shows the Fig. 3 circuit and its equivalent transmission circuit from which a formula has been derived for calculating the transmission performance of the circuit.
Figure 5:
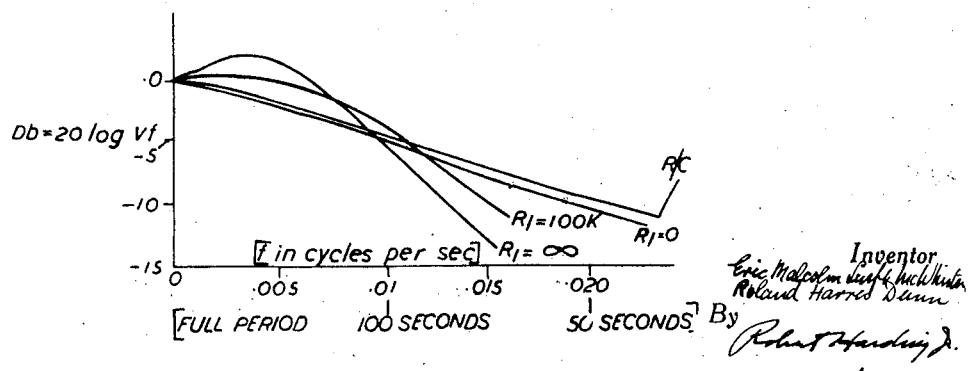

Fig. 4 also shows the usual resistance-capacity network for comparison;

Fig. 5 is a performance graph for the circuit shown in Fig. 3;

Fig. 6 shows another rate measurement device of a more complex character for uniform operation of a much wider range; while Fig. 7 shows another rate measurement device functioning in a different manner.

Referring first to Fig. 1, a condenser CC is charged from an invariable source of negative potential via back contacts $b$ of switch IR. IR is controlled by an equipment under test and is operated at intervals for impulse counting or impulse rate measurement.

The front contacts $f$ of IR are connected to a second condenser C which is in parallel with a phase-reversing high gain voltage amplifier AMP between points IT, OT. Point OT is connected via resistance RL to a meter M adapted to record the voltage at point OT.

Point IT is nominally at earth potential, but may be biassed. When contacts IR are operated, the negative potential of condenser C begins to build up at point IT. The amplifier AMP rapidly reacts to the change in potential at IT resulting in an amplified positive potential appearing at OT. The amplified voltage at OT charges the condenser so that the input terminal IT does not in fact change potential except to a small extent which is a fraction of the increase in potential at OT, the fraction being the inverse of the amplifier gain. The condenser constitutes a negative feed back path for the amplifier.

Each time contacts IR change over from back to front, the voltage OT is positively increased by an equal increment, so that with the voltage at IT remaining substantially constant, the increment of charge in condenser C at each change over of IR is the same and the charge on C increases linearly instead of logarithmically, so long as the amplifier is working below full load. The positive voltage at OT is therefore proportional to the number of operations of contacts IR.

A suitable form of amplifier is shown in Fig. 2, but alternatively the amplifier described in the application filed by B. B. Jacobsen, on November 27, 1945, bearing Serial No. 631,153, now abandoned, could be used.

The circuit shown in Fig. 2 is for measuring a number of similar operations, each having a constant value, but differing in value one from another. Such a problem arises when it is desired to integrate the total quantity of coal fed by the automatic stokers for the boilers of an electricity generating station, the stokers varying in capacity.

Each time an automatic stoker operates it causes a short change-over of contacts such as IR1. The back contacts of each switch IR1 completes a charging circuit for an associated condenser CC1 between earth and a tapping on a potentiometer P, connected between negative and positive terminals of a source of D. C. potential.

The condenser characteristics and the tappings on the potentiometer are chosen so that the condenser charges are proportional to the corresponding stoker capacities.

When an automatic stoker operates, the contacts of IR1 change over and the corresponding condenser CC1 is connected to input terminal IT of a condenser C. A pentode valve PV has its control grid connected to point IT and has its anode circuit connected via a neon cold cathode tube NT to the output terminal OT of condenser C, which terminal is also connected to negative potential of the same value (300 volts) as the valve feed.

Terminal OT is also connected to the firing electrode of a cold cathode tube CCT adapted to fire at a predetermined potential. The discharge circuit of CCT includes a telephone-type relay $$\frac{A}{2}$$

which interacts with a slow-release relay $$\frac{B}{2}$$

Each time any switch IR1 operates, the connection of a condenser CC1 to point IT results in an increment of positive potential at OT proportional to the furnace charge which has been stoked. The drop of potential across NT, which is discharging between 300 volts negative via 2 megohms and the positive feed circuit to the anode of PV, will remain constant so that the increment of positive potential is fully transferred to OT.

When the potential at OT reaches the value at which CCT fires, the relay $$\frac{A}{2}$$

is operated, followed by relay $$\frac{B}{2}$$

which releases $$\frac{A}{2}$$

and changes over its contacts b2 during its slow release by $$\frac{A}{2}$$

Contacts b2 control the connection of another condenser CC2 to a positive tapping on potentiometer P and to terminal IT. The connection of positive potential from CC2 to point IT causes a decrement of positive potential at point OT so that, the circuit of CCT having been opened, it will not again fire.

The circuit arrangements are such that the decrement of potential at OT due to the connection of condenser CC2 is equal to the total increment of potential at OT from neutral condition, due to successive connections of condensers CC1 to IT, which caused CCT to fire.

Each operation of relay $$\frac{A}{2}$$

operates a counter M via $a2$, so that counter M records the total amount of coal stoked.

As the potential at OT is periodically reduced the circuit is capable of continuous operation without PV deviating from the desired portion of its operating curve.

The range of potential over which condenser C is charged is divided between positive and negative directions of charge to a more or less equal extent. This minimizes any inaccuracy of result arising from internal leakage of the condenser.

As the condensers CC1 and CC2 are charged from a common source, there is no need to have a stabilized source of potential, as any change in potential will affect all charging circuits to a comparable degree.

Further, although the potential at which CCT operates may vary, resulting in differences between the successive increments and decrements of potential on OT, these will tend to average themselves out over a period. If however greater accuracy is required, the cold cathode tube may be replaced by a triode or pentode trigger circuit.

Referring to Figure 3, contact IR changes over at the rate being measured. At its back contact, in the state of rest, condenser GC is charged from a stabilized −110 v. source, the stabilization being by the neon tube ND. Each time contact IR changes over it applies a large negative-going impulse through the 100K resistor to the input terminal IT. This is connected to the control grid of a high gain pentode PV. The valve PV has connected between anode and control grid a condenser C in series with a neon tube NT. By Miller effect, as is well known, the effective capacity between anode and control grid of a valve having a resistive anode load equals the product of its actual capacity and the gain of the valve. Therefore the effective capacity of C is extremely high compared with that of condenser GC (condenser C has a higher actual value than condenser GC).

Under no-input conditions the pentode PV is conducting, with its grid voltage at or near earth potential. Hence the anode potential is comparatively low. The neon tube NT maintains a constant potential difference across its terminals being connected in a potentiometer circuit from +300 v. to —300 v., and is chosen, in the present case, so that the potential at point OP in a state of rest, is at or near, earth potential. Hence any change in potential at the anode of valve PV will appear substantially unattenuated at OP. The potential at OP is taken to the grid of a cathode follower valve CFT, being actually taken from the cursor of potentiometer PM and a smoothing circuit TD. The potentiometer setting is so adjusted that meter MCI reads zero under no signal conditions. The cathode circuit of CFT is split into two branches, one through a 20K resistance and a meter MCI to earth; the other through a 1K and a 100K resistance to —300 v. From the junction of the latter two resistances a connection is taken over resistance CM (of about 6 megohms) to the input terminal IT. This constitutes a further feedback circuit, and under no-input conditions no current flows in this circuit since both the junction between the 1K and 100K resistances and point IT are substantially at earth potential.

On the first change-over of contact IR a negative-going 110 volts impulse is applied to the front contact of IR. Since this impulse is supplied to the 100K resistance and the grid circuit of PV in series, the proportion of the 110 volts appearing on the pentode grid will be comparatively small and in fact will be insufficient to cut PV off. This potential is also applied to condenser C to charge that condenser negatively. On the grid of PV going negative, the voltage on the anode will go more positive immediately, by normal valve action, which positive-going change of voltage will appear on the grid of PV through the feedback circuit. The effect of this feedback on the voltage rise from anode to grid would be to reduce the anode voltage which, through the feedback circuit would tend to reduce grid voltage, i. e. to make it more negative. The result of this would be to increase anode voltage, so we have two contradictory actions attempting to occur. The net result is that the anode voltage will rise and grid voltage fall as C charges. This changing charging current produces a positive going stepped wave-form at OP which is applied to the grid of CFT over the smoothing circuit TD, which comprises a resistance GM and condenser 4 having a long time constant. This waveform is initially a stepped waveform, but, as will be described, will resemble a time-base wave-form when equilibrium is reached.

When the waveform from OP reaches the grid of CFT it will be substantially a straight line voltage, increasing until the circuit reaches equilibrium, and will be transferred to the cathode of CFT by normal cathode-follower action. Meter MCI will therefore give a reading dependent on the value of this potential due to the altered current flow in that limb of the circuit. Since the junctions of the 1K and 100K resistors is at substantially the same potential as the cathode of CFT, the said junction will be positive with respect to IT, and a current flows in CM. This current opposes the effect of the input pulses which tend to produce a falling voltage of stepped waveform on the grid of PV. In the present embodiment of the invention the circuit is so proportioned that by this means the grid potential is returned to its pre-signal level just in time for the next impulse. It would of course be possible to so proportion the circuit that the grid potential, and hence the charge on C was only reduced by a predetermined fraction prior to the arrival of the next impulse. When the circuit reaches a state of equilibrium for a given rate of impulsing, it will be seen that the wave-form at OP will be a positive-going waveform of a time base-like type, the voltage on the grid of CFT will be a substantially steady D. C. voltage which will appear on the cathode by normal cathode-follower action, and there will be steady flow of "discharging" current through CM, and hence a steady reading in MCI.

If the impulse rate increases, an impulse will arrive before C is completely discharged. This will make the grid of PV more negative than usual and the anode of PV and potential at OP more positive than usual. Thence the grid and cathode potentials of CFT will increase, thus increasing the feedback rate over CM, and hence the reading in MCI. It will be apparent that since the circuit involves high time constants, notably those associated with the pentode valve PV and smoothing circuit TD, it will be several seconds or even minutes before the circuit settles down for an increased impulsing rate. This action considered in reverse explains the action when the impulsing rate is reduced.

The contacts IR may be operated by, say, a kilowatt-hour meter. For such an application the device may be provided with a plurality of impulse circuits of the same type as that shown. This is indicated diagrammatically by the arrows X, Y.

It will be understood that the input system represented in this embodiment by the condenser GC and associated elements could be replaced by any device for feeding in a succession of substantially equal impulses at the rate to be measured.

A connection is taken from the cathode of CFT via a resistance to a 0/5 milliampere moving coil instrument.

The point OT and the cathode of CFT are approximately at earth potential when the circuit is idle while the point TDT is about 10 volts negative with the circuit characteristics shown.

In this case, instead of the voltage at OT building up by successive increments, the leakage circuit stabilizes itself for a given rate of impulsing at IR and each charge on condenser C just leaks away before the next pulse in saw tooth fashion. The time delay has a constant of the order of 20 seconds and smooths out the saw tooth voltage variations at OT to a straight line value which is transferred at about 90% value by the cathode follower tube CFT. Substantially the whole voltage on the CFT cathode is applied to the leak circuit, leakage taking place via resistance GM, valve CFT, PM cursor, terminal OP, neon tube NT and the anode circuit of PV.

If E is the potential on the lead running from IT to a point between the two cathode resistors of CFT, and $q$ is the charge given to condenser C, then $$q = \frac{E}{6 \text{ megohms}} t$$

where $t$ is the impulsing period. Assuming $q$ is constant, and the resistance being constant, then $$E \alpha \frac{1}{t} \alpha f$$

the rate of impulsing at contacts IR.

The meter MCI reads zero when the circuit is idle, and responds to potential on the cathode of CFT to give a reading proportional to the rate of impulsing of contacts IR.

If contacts IR are on a kilowatt-hour meter then MCI will read in kilowatts. If several KWH meter contacts IR with condensers proportioned to the meter ratings are connected in parallel, then the meter MCI will record total kilowatts.

Several milliammeters MCI may be connected in parallel through a further milliammeter to a common earth, and the further instrument will record the summation of the records on the paralleled instruments. Further stages of integration are possible, so that the load on individual generators, complete stations, and groups of stations may be recorded. Alternatively, a group of instruments MCI may each be connected to earth and also connected through paralleled resistances to a further integrating instrument.

The performance of the metering circuit shown in Fig. 3 is shown by the curves in Fig. 5, which have been calculated on the assumption that instead of the transfer condenser input, a sinewave generator input is used through a resistance RI. For constant voltage on this sine-wave generator the output voltage V would vary as shown in the graph when the input frequency is varied.

Fig. 4 shows a simplified form of the circuit of Fig. 3, its equivalent circuit, and for comparison an ordinary resistance capacity network in which the current $i$ would be from a switched pentode (controlled On period) or from a small condenser discharging into the 4μF condenser (V must then be small). The formula from which the curves of Fig. 5 have been calculated is:

$$\frac{V}{e} = \frac{\frac{R_4}{R_1}\left(\frac{\mu}{j\alpha} - 1\right)}{\left\{(1+n)\left(1+\frac{R_4}{R_1}\right) - K + (1+\mu)\frac{R_4}{R_2}\right\} + j\left\{\left(n\alpha - \frac{1}{\alpha}\right)\left(1+\frac{R_4}{R_1}\right) - \frac{K\mu}{\alpha} + n\cdot\frac{R_4}{R_2}(1+\mu)\alpha\right\}}$$

Where $\alpha = \omega C_1 R_2$ $$n = \frac{R_3}{R_2}$$

Three curves are shown, one in which the resistance RI is of 0 value, and another for which RI→∞. A third curve has RI=100K ohms.

These curves, pkarticularly the two last ones, show that the circuit has a very good low pass filter characteristic with a cut-off of somewhat below 100th of a cycle per second. The time of rise for a pulse sent into this network will probably be of the order of 50 seconds. For comparison, a fourth curve shows the performance that would be obtained using an ordinary resistance capacity network.

In considering the three curves as they will apply to the present problem, it should be borne in mind that the input wave will, of course, itself depend on RI. If RI→0, the input current wave will be a very steep pulse. However, since a fixed voltage is being discharged the contents of frequencies in the lower end of the spectrum will not be affected by the steepness of the pulse. The frequencies in the upper end of the spectrum which are increased in value by reduction of RI do not, of course, reach the output voltage V on account of the high loss of the circuit at high frequencies. The advantage of the circuit over the plain resistance capacity network is that it gives a fairly flat attenuation curve for the important frequencies up to about 100th of a cycle per second which carry the real information to be extracted from the input pulses ("The mean voltage envelope").

The filter aspect of the circuit will be the subject of a further application.

The circuit of Fig. 3 gives good results for a wide range of frequencies, for instance, it will give results of commercial accuracy from full load down to 5% of full load in an electricity generating station. If, however, the full range is required with accuracy, a time delay in association with the arrangement of Fig. 1 cannot be successfully utilized, and the circuit of Fig. 6 has been developed for such cases. In the circuit two Fig. 1 circuits are used in series, one as an impulse responsive leak circuit and the other as a change of rate detection circuit.

It is convenient for this purpose to use the circuit disclosed in the said application of B. B. Jacobsen rather than the circuit shown in Fig. 3. The circuit shown in the said application can be used in any application of the Fig. 1 principle but in cases where more than a few milliamperes of output is required, power amplification would be necessary, as foreshadowed in the said application.

Referring now to Fig. 6, two impulsing contacts IRA, IRB operated by the same means control the charging of condensers CC, CD and their simultaneous connection to condensers CA, CB respectively. The condenser plus amplifier circuits CA, AA; CB, AB are of the kind described in the said application of B. B. Jacobsen.

Whereas condenser CC is charged from an invariable source of potential, condenser CD is conditioned by the output potential of the condenser CA, AA circuit at point OTA.

The alternating current output from amplifier AB is fed to a bridge circuit comprising two rectifier arms PR, NR connected to point OTB, and two equal resistance arms comprising respectively resistance RC and meter M, and resistance RB. The resistance arms are connected between the rectifier arms and common earth, while the common points between the rectifier and resistance arms are connected to condenser CB and a leak circuit for condenser CA via resistance RD respectively.

When the circuit is idle and ready to receive impulses, the first operation of contacts IRA, IRB results in connection by CC of negative potential to point IRA. In consequence, amplifier AA raises the potential at point OTA positively and CA becomes charged, point ITA remaining at nominal earth.

Condenser CD had no charge when the contacts operated and therefore no change takes place in the CB, AB circuit and there is no leak via RD.

The second time contacts IRA, IRB operate, amplifier AA builds up the potential at OTA by a further equal positive increment, and CD applies a positive potential to point ITB, causing amplifier AB to operate and apply an alternating potential to point OTB. The rectifier bridge is arranged to generate a positive D. C. potential on the leak circuit via RD and a negative D. C. potential to condenser CB which charges.

During the period before the next impulse, charge from CA leaks via RD so that the potential on point OTA is gradually reduced. At the next impulse, amplifier AA will again build up the potential on point OTA, and CD having been charged by a potential which although due to the leak is not double the potential at which it stood at the previous operation of the contacts, is greater than it was before, amplifier AB builds up potential via PR and NR so as to increase the rate of leakage via RD. The state of unbalance will continue with the potential on CD, when contacts IRB operate, getting smaller and smaller as the leak gradually reduces the residual charge on CA at the end of successive intervals between impulses. The circuit will gradually reach a state of balance for the existing impulsing rate in which the leak reduces the potential on point OTA to normal at the end of each interval so that no potential is applied by CD to ITB, and the amplifying condition of AB and the rate of leak remain unchanged. The reading on meter M which has been oscillating now settles to a steady reading which is a measure of the rate of impulsing.

No change will take place until the rate of impulsing changes when at the end of an interval potential at OTA will be off-normal, and CD will transfer a potential to AB, CB to start a period of change in the leak until a steady state is again reached and the meter records the new impulsing rate. This circuit has no time constant and is equally accurate at any frequency however slow.

The fact that condenser CA receives two successive charges before the leak circuit is rendered operative prevents the CB, AB circuit building up too rapidly and building up an opposite potential on CA.

It will be seen that if impulsing ceases, contacts IRB will operate no more and therefore the circuit CB, AB will remain in its set condition, and the leak circuit will continue to operate changing the polarity of potential on condenser CA. In order to return the circuit to normal, a valve (not shown) will respond to the abnormal condition on CA and operates a relay to apply a leak to reduce the condenser CB to normal condition, when the whole circuit will return to normal.

Fig. 7 shows a different application of the principles of the invention, in which the operation of the contacts of a kilowatt-hour meter are used to produce a D. C. potential for use in controlling the transmission of teleprinter signals indicative of the reading of the meter as described in our copending application filed January 2, 1947, and bearing Serial No. 719,773 now Patent No. 2,547,035, issued April 3, 1951.

This circuit for kilowatt translation is based on obtaining the reading from a kilowatt-hour meter such as is normally part of power station equipment, fitted with a change-over contact which normally exists for the printometer circuit. The change-over contacts M charge condenser CA from battery $e$ in one position and discharge CA into CB in the other position. Condenser CB has a leak resistance YA and the voltage across condenser CB arrives at a stable figure when the quantity which leaks away through YA between impulses equals the quantity put in by CA on each impulse. To obtain linearity it is necessary that CA should always supply the same quantity. It should therefore always be charged to a voltage which is $e$ plus the voltage on CB. A cathode follower valve V is therefore operated from CB and provides a cathode voltage normally equal to the grid voltage. This cathode voltage and supply $e$ are connected in series.

Supply $e$ is shown as a battery but would normally be a small rectifier circuit.

Linear output is obtained only if the cathode voltage exactly equals the grid voltage. This can be obtained for all practical purposes by making the cathode follower V a high gain amplifier. If the ratio between the cathode voltage and the grid voltage is $k$ a similar result can be obtained by discharging condenser CA to $k$, the grid voltage; this can be effected by connecting CA to a suitable tapping on YB.

What is claimed is:

1. An electrical measuring circuit comprising an amplifier having an input circuit and an output circuit, a potential divider comprising means to maintain constant the potential across a portion thereof, a storage condenser connected in a degenerative feedback path coupling said input circuit and said output circuit, said output circuit and said feedback path being established through that portion of said divider whose potential is maintained constant, means to apply a given electrical charge of one sign to said storage condenser and said input circuit under control of a factor to be measured, additional circuit means coupled to said output circuit and responsive thereto, for periodically applying to said input circuit and said storage condenser a unidirectional potential of a sign opposite to that of said given charge, whereby the potential across said condenser is reduced, and indicating means associated with said additional circuit means for measuring the rate of transfer of energy from said additional circuit means to said input circuit and said storage condenser.

2. An electrical measuring circuit as claimed in claim 1, wherein said additional circuit means comprises a non-phase reversing amplifier having a degenerative feedback circuit associated therewith, a connection from said last named feedback circuit to said input circuit and said condenser.

3. An electrical measuring circuit as claimed in claim 1, wherein said means to apply a given electrical charge to said storage condenser comprises a second condenser and a source of unidirectional potential, said second condenser adapted to be alternately charged by said source and to be discharged into said storage condenser and said input circuit.

4. An electrical measuring circuit as claimed in claim 1, wherein said means to apply a given electrical charge to said storage condenser comprises a plurality of further condensers each having a storage capacity of a value smaller than said storage condenser, each of said further condensers adapted to discharge quantities of electrical charge to said storage condenser at random intervals.

5. An electrical measuring circuit as claimed in claim 1, wherein said additional circuit means further comprises a smoothing filter to remove fluctuations in the output of said amplifier.

6. An electrical measuring circuit as claimed in claim 1, wherein said additional circuit means comprises a non-phase reversing amplifier having a degenerative feedback path associated therewith, said feedback path having two branches, said indicating means in series with one of said branches, and said input circuit and said condenser connected to the other of said branches.

ERIC MALCOLM SWIFT McWHIRTER.
ROLAND HARRIS DUNN.

REFERENCES CITED

The following references are of record in the file of this patent:

UNITED STATES PATENTS

| Number | Name | Date |
| --- | --- | --- |
| 1,995,890 | Lord | Mar. 26, 1935 |
| 2,078,792 | Fitzgerald | Apr. 27, 1937 |
| 2,097,896 | Salzberg | Nov. 2, 1937 |
| 2,329,048 | Hullegard | Sept. 7, 1943 |
| 2,411,573 | Holst et al. | Nov. 26, 1946 |